Patented June 22, 1937

2,084,702

UNITED STATES PATENT OFFICE 2,084,702

METHOD OF MAKING EXTRUDED RUBBER ARTICLES FROM AQUEOUS DISPERSIONS OF RUBBER

Ugo Pestalozza, Milan, Italy, assignor to Società Italiana Pirelli, Milan, Italy No Drawing. Application August 3, 1934, Serial No. 738,376. In Italy August 9, 1933

4 Claims. (Cl. 18—50)

The invention relates to an improvement in the manufacture of extruded articles from heat sensitized aqueous dispersions of rubber.

It is known that certain substances, such as salts of bivalent or trivalent bases, bisubstituted guanidines, and oxides of bivalent metals in the presence of ammonium salts, can be introduced into rubber latex in such quantities that coagulation is not effected at ordinary temperature, but will take place upon appropriate heating to temperatures below 100° C. (see applicant's Reissue Patent No. 18,438, British Patent No. 292,964, and U. S. Patent Nos. 1,750,540 and 1,811,695).

From these heat sensitized dispersions, rubber articles of desired thickness can be obtained by dipping therein for a sufficient time formers heated to temperatures causing the dispersion to coagulate in the required thickness thereon. Continuous extruded articles of any desired length can be obtained by causing the dispersion to flow through a nozzle heated near the outlet to a temperature lower than 100° and preferably between 70–95° C. The flowing of the latex into the nozzle and the continuous extrusion of the coagulated product is obtained by the application of a sufficient pressure to a container of latex connected with the nozzle.

The above method of manufacture of extruded articles has two advantages. Rubber threads and rods of any desired shape and of unusual dimensions, even of a diameter over 15 m/m can be produced, and upon introducing a core into the nozzle, so that the latex will flow through an annular orifice, tubes of any kind can be obtained from small valve tubing to tubes which can be used in the manufacture of inner tubes for vehicle tires. Moreover, such articles obtained from latex of even consistency using the same nozzles have walls of perfectly even cross-section owing to the fact that the article is made by the coagulum which is continuously formed in the heated portion of the nozzle, the coagulum reproducing the exact internal shape of the nozzle itself and being sufficiently stiff to be collected and finished without undergoing any deformation.

By this method, however, the production speed is relatively low so that its efficiency is lessened in the manufacture of special articles, for instance, elastic thread.

The present invention obviates said inconvenience and makes the method susceptible to a broader industrial exploitation. As has been said, the known method consists in coagulating the heat sensitized latex by heating a sufficient portion of the nozzle outlet, while the latex flows through it from the container to which the nozzle is directly attached, the flowing of the latex and the egress of the coagulum being obtained by application of pressure on the latex in the container, for instance, by means of compressed air. The pressure used is generally below 1 atm. and frequently below 0.5 atm.

A thorough investigation of the process has proved that the gliding of the coagulum by the low pressure applied is obtained because a small quantity of serum separates from the coagulum and serves as a lubricant between the coagulum and the inner surface of the nozzle, so that the very high friction between the nozzle and the coagulum is considerably reduced.

It has been proved that the gliding speed of the coagulum depends on the lubricating capacity of the serum and that the more rapid and abundant is the secernent of serum from the coagulum, the greater is the speed. Moreover, the point of maximum friction is located on the beginning of the heated portion of the nozzle, i. e., where the latex begins to coagulate.

The lubricating capacity of the serum can be increased by the addition of appropriate materials, such as alkaline soaps, saponine, glycerine, glucose, etc. Of course, the additional material has to be so chosen as to have no effect on the other materials, which are introduced into latex either to sensitize it to heat or as vulcanizing agents or fillers. For instance, if an alkaline soap is introduced into latex, which has been compounded with magnesium or zinc salt to sensitize it to heat, or with zinc oxide to assist the accelerator during the vulcanization, a formation of magnesium or zinc soap takes place and the original lubricating capacity is not increased, except when the alkaline soap introduced into the latex is added in a quantity greater than the quantity required to react with the magnesium or zinc salts or with the zinc oxide compounded with the latex. The secernment speed of serum from the coagulum depends on the coagulation speed of latex in the heated section of the nozzle and on the characteristics of the coagulum, which depend upon the materials employed for heat sensitizing the latex. For instance, latex compounded with zinc salts has a better behavior than latex compounded with compounds of alkaline earth metals. Good results are obtained with mixing compounds of alkaline earth metals with zinc salts or zinc oxide. After the sensitizing materials are selected, the required quantities of the same to obtain the heat sensitized latex are determined by some simple tests in order to easily extrude the latex. If the sensitizing materials are insoluble or not easily soluble, better results are obtained when they are introduced into latex in extremely divided condition. Ammoniated latex, which has been preheated, for instance for an hour at 60° C. and then cooled, has a better behavior than original latex.

A long maturing of the sensitized dispersion for the extrusion generally improves the extrusion characteristics. A similar and more efficacious result is obtained by heating the prepared dispersions, provided, of course, the temperature and the time are so selected that only a small increase of viscosity but not coagulation takes place.

According to these directions, dispersions adapted to be used in the present method of extrusion can be prepared. The hereinafter described example will fully show the way by which such directions can be applied.

It has already been said that a very high friction, which greatly restrains the extrusion of the coagulum from the nozzles, is offered on the beginning of the heated section of the nozzle where the latex begins to coagulate. Through the tests, it has been ascertained that the latex contacting the walls of the nozzle is coagulated at that point, while an inner vein of liquid latex remains, which becomes gradually smaller as it approaches the outlet of the nozzle. This vein is not coagulated immediately because of the time required for the heat, which produces the coagulation, to propagate through to the inside of the liquid mass.

Whether the friction is caused by the pressure, applied to the latex to produce the flowing, acting through the liquid vein to press the coat of the already coagulated latex perpendicularly against the inner surface of the nozzle or by the coagulated coat being in that portion of the nozzle which is too short to leave on the surface of the nozzle the serum in such a quantity that a good lubricating can be obtained, having thus for a certain section a very high friction between the coagulated rubber and the inner surface of the nozzle, or whatever the cause, the friction is greatly decreased, so that the coagulum can easily glide, when the latex comes to the heated part of the nozzle in such a condition that it can be coagulated in every point of its mass, whereby the liquid inner vein is made as small as possible.

This result is obtained when the latex arrives at the nozzle in crude condition but heated to a temperature near the coagulation temperature, for example, when the portion of the nozzle, which is heated to cause the coagulation, is preceded by a portion heated to a lower temperature, whereby the latex receives the required preheating.

The latex flowing through the first heated section of the nozzle becomes warm, though remaining fluid, and approaches the coagulation temperature, so that when it arrives at the second portion of the nozzle it coagulates suddenly throughout its mass, as the difference between the temperature which the latex has reached and the temperature of coagulation is only of few degrees instead of the large difference between the coagulating temperature and room temperature which would exist if the latex were not preheated.

The increase of speed thus obtained depends on the compounding of the mix, but it is always appreciable. The speed which can be attained is about ten times greater than the speed which can be reached without preheating of the latex during the extruding. Such an increase in speed of extrusion does not have any detrimental effect on the regularity of the resulting product.

The preheating of the latex can be effected in any manner which will insure that the latex arrives in fluid condition and at the required temperature at the nozzle portion heated for coagulation. Nozzles longer than the usual nozzle are preferably used, the latex being preheated by a heating bath in the portion of the nozzle preceding the coagulation heated portion.

The following example illustrates one method of carrying out the invention. To 167 grams of concentrated latex of 60% dry residue content, preserved with ammonia, are added the vulcanizing agents (accelerators and sulphur in due proportion) and anti-aging agents in fine suspension in 10 c.cms. of water and 12 grams of glycerine, 0.5 gram of ammonium sulphate dissolved in 2 c.cms. of water, and 1.7 grams of crystallized zinc sulphate dissolved in 12 c.cms. of water to which 6 c.cms. of water solution of ammonia are added to obtain the solution of zinc hydrate. The zinc sulphate alone would sensitize the latex to heat. The addition of ammonium sulphate allows a more rapid coagulation and therefore a more prompt extrusion. The glycerine, besides assisting the dispersion of the ingredients, increases the lubricating capacity of the serum. Without glycerine, the under-mentioned speeds would be remarkably lower. After mixing, the dispersion is heated for one hour at 50° C. and after cooling, it is of slightly increased viscosity and is then ready to be extruded.

The extruding device comprises a small glass tube, whose inner diameter is 2.5 mm. A first portion of the tube is heated for a length of 20 cms. by means of a water bath kept at 83°–85° and the portion near the outlet is heated for a length of 10 cms. with another bath at 91°–93°. The first portion is thus heated to a temperature a little lower than the temperature required for the coagulation, which, for the above-mentioned dispersion, is about 87°–88°. The nozzle is connected with the dispersion container, in which a pressure of 0.25 atm. is maintained by compressed air. If the first portion of the nozzle were not heated, so that the latex arrives at the second portion of the nozzle at room temperature, the extrusion speed is about 10–12 cms. per minute. If the first bath is heated at the mentioned temperature of 83°–85°, the extrusion speed of the coagulated thread is about 90–95 cms. per minute.

Instead of a single nozzle, more nozzles parallelly mounted side by side on the same level are used in actual practice.

In the above example, there has been considered a dispersion to which only the vulcanizing and anti-aging agents are added, as generally is the case in dispersions for the manufacture of elastic thread for weaving purposes. The dispersion, however, may contain also fillers and accelerators which are used in the rubber industry. It may even be said that the presence of filler generally facilitates the extruding. The dispersion may be vulcanized, as in this case a better action is obtained than with the usual unvulcanized dispersions. The obtained articles are then manufactured as usual.

I claim as my invention:—

1. A process of manufacturing rubber articles in lengths, comprising extruding a coagulable aqueous dispersion of rubber containing a coagulating agent of such nature and in such amount as will coagulate the dispersion at a minimum temperature between 70–95° C. through a forming tube, heating a length of the tube adjacent the discharge end thereof to a temperature which will coagulate the dispersion passing therethrough, and heating another length of the tube further removed from the discharge end thereof to a temperature of approximately a few degrees below the coagulation temperature of the dispersion.

2. A process of manufacturing rubber articles in lengths from a coagulable aqueous rubber dispersion, comprising adding to the dispersion a coagulating agent of such nature and in such amount as will coagulate the dispersion at a minimum temperature between 70–95° C., passing a stream of the dispersion through a zone heated to a temperature of a few degrees below the coagulation temperature thereof and of a sufficient length to bring substantially the entire cross-section of the stream to the temperature of the zone, and then passing the stream through an extrusion device heated to a temperature which will coagulate the dispersion.

3. A process of manufacturing rubber articles in lengths, comprising extruding a coagulable aqueous dispersion of rubber containing a coagulating agent of such nature and in such amounts as will coagulate the dispersion at a minimum temperature between 70–95° C., and a lubricant-forming substance selected from the group consisting of glycerine, alkaline soap, saponine and glucose, through a forming tube, heating a length of the tube adjacent the discharge end thereof to a temperature which will coagulate the dispersion passing therethrough, and heating another length of the tube further removed from the discharge end thereof to a temperature of approximately a few degrees below the coagulation temperature of the dispersion.

4. A process of manufacturing rubber articles in lengths from a coagulable aqueous rubber dispersion, comprising adding to the dispersion a coagulating agent of such nature and in such amount as will coagulate the dispersion at a minimum temperature between 70–95° C., and a lubricant-forming substance selected from the group consisting of glycerine, alkaline soap, saponine and glucose, passing a stream of the dispersion through a zone heated to a temperature of a few degrees below the coagulation temperature thereof and of sufficient length to bring substantially the entire cross-section of the stream to the temperature of the zone, and then passing the stream through an extrusion device heated to a temperature which will coagulate the dispersion.

UGO PESTALOZZA.